(12) United States Patent
Olafson

(10) Patent No.: US 11,936,560 B1
(45) Date of Patent: Mar. 19, 2024

(54) SYSTEMS AND METHODS FOR DATA FLOW BETWEEN MOBILE APPLICATIONS AND CUSTOMER PREMISES EQUIPMENT, USING A CONSISTENT SERVER HASH

(71) Applicant: The ADT Security Corporation, Boca Raton, FL (US)

(72) Inventor: David Magnus Olafson, Birdsboro, PA (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/314,425

(22) Filed: May 9, 2023

(51) Int. Cl.
*H04L 45/7453* (2022.01)
*G08C 17/02* (2006.01)
*H04L 47/125* (2022.01)

(52) U.S. Cl.
CPC .......... *H04L 45/7453* (2013.01); *G08C 17/02* (2013.01); *H04L 47/125* (2013.01); *G08C 2201/93* (2013.01)

(58) Field of Classification Search
CPC ... H04L 45/7453; H04L 47/125; G08C 17/02; G08C 2201/93
See application file for complete search history.

(56) References Cited

U.S. PATENT DOCUMENTS

| | | | |
|---|---|---|---|
| 7,567,504 B2 * | 7/2009 | Darling | H04L 67/1017 370/428 |
| 8,248,928 B1 * | 8/2012 | Wang | H04L 43/026 370/230 |
| 9,397,946 B1 * | 7/2016 | Yadav | H04L 45/7453 |
| 10,999,361 B2 | 5/2021 | Husar et al. | |
| 11,388,225 B1 * | 7/2022 | Duraj | H04L 67/1023 |
| 11,652,746 B1 * | 5/2023 | Sorenson, III | H04L 9/0643 370/235 |
| 2006/0248195 A1 * | 11/2006 | Toumura | H04L 67/1023 709/226 |
| 2011/0099351 A1 * | 4/2011 | Condict | G06F 3/0608 711/216 |
| 2014/0310390 A1 | 10/2014 | Sorenson, III et al. | |
| 2015/0334179 A1 * | 11/2015 | Eisenbud | H04L 67/1027 709/226 |
| 2016/0094456 A1 * | 3/2016 | Jain | H04L 41/5054 370/235 |
| 2016/0099872 A1 * | 4/2016 | Kim | H04L 47/125 370/235 |
| 2017/0026488 A1 * | 1/2017 | Hao | H04L 67/60 |

(Continued)

*Primary Examiner* — Michael J Moore, Jr.
(74) *Attorney, Agent, or Firm* — Christopher & Weisberg, P.A.

(57) ABSTRACT

According to some embodiments, a system for managing customer premises equipment is provided. The system comprises a plurality of server groups, where each server group of the plurality of server groups is associated with a respective one of a plurality of hash values. The system comprises a load balancer that is configured to receive first signaling from a customer premises equipment associated with a first customer, the first signaling indicating a first hash value of the plurality of hash values, determine a first server group of the plurality of server groups to service the customer premises equipment based on the first hash value, select a first server of a plurality of servers in the first server group to service the first message, and route the first signaling to the first server to service the first signaling.

20 Claims, 10 Drawing Sheets

(56) References Cited

U.S. PATENT DOCUMENTS

| | | | |
|---|---|---|---|
| 2020/0084269 A1* | 3/2020 | Husar | H04L 45/7453 |
| 2020/0287829 A1* | 9/2020 | Lam | H04L 45/7453 |
| 2020/0287830 A1* | 9/2020 | Capper | H04L 67/1001 |
| 2021/0314221 A1 | 10/2021 | Hong et al. | |
| 2022/0030060 A1* | 1/2022 | Jain | H04L 47/20 |
| 2022/0407771 A1* | 12/2022 | Wang | H04L 41/0846 |

* cited by examiner

US 11,936,560 B1

SYSTEMS AND METHODS FOR DATA FLOW BETWEEN MOBILE APPLICATIONS AND CUSTOMER PREMISES EQUIPMENT, USING A CONSISTENT SERVER HASH

TECHNICAL FIELD

The present technology is generally related to data flow management between entities in a premises monitoring system based on server hashing.

BACKGROUND

Customers often want the ability to interact with devices in their homes from anywhere in the world. This may present challenges to service providers who deliver traffic between customer mobile applications and customer premises equipment. Such challenges are that it is difficult to do this efficiently at scale, when mobile applications connect intermittently, and customers expect service with low latency.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
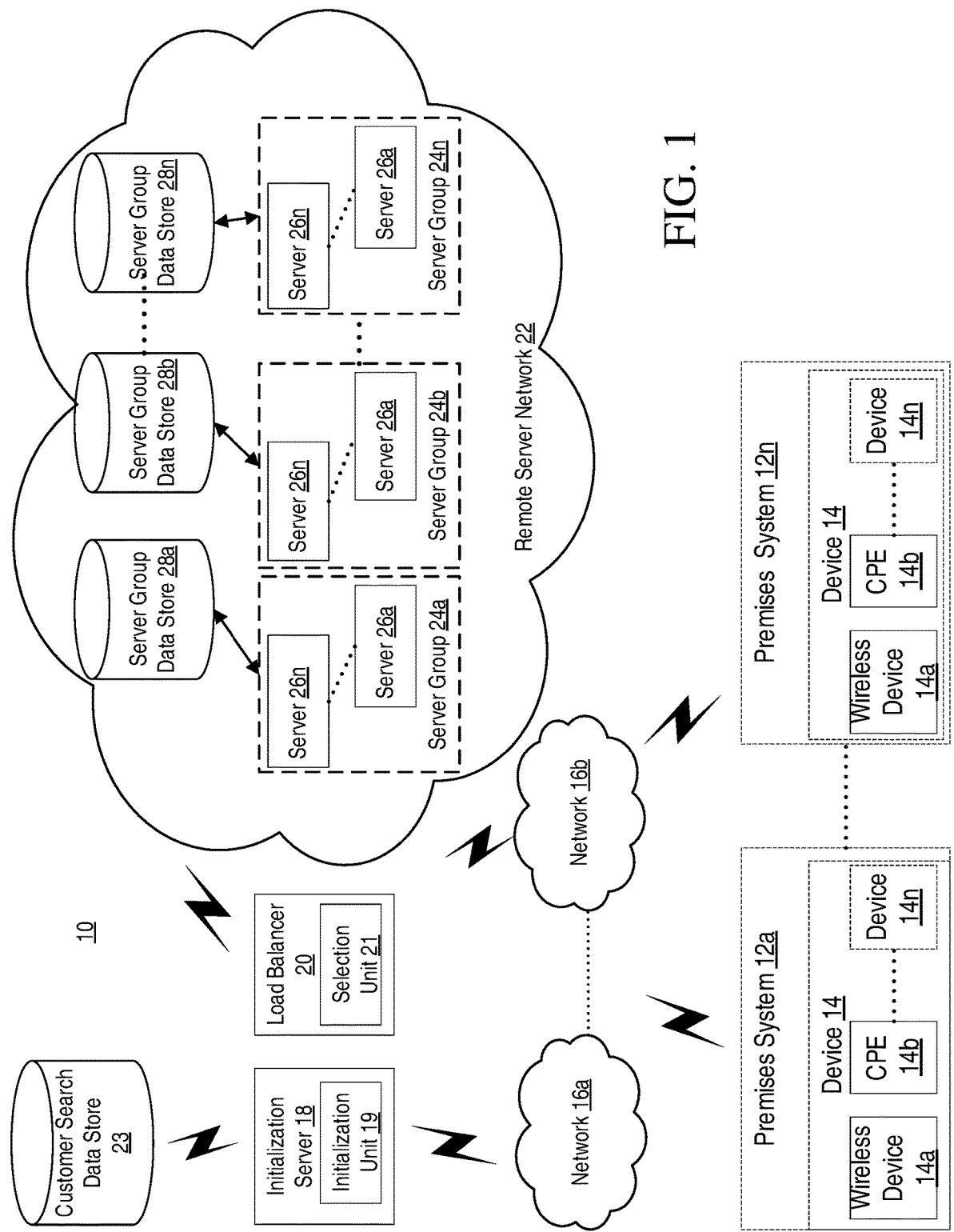
FIG. 1 is a block diagram of an example process according to some embodiments of the present disclosure.

Historically, IoT connectivity has been implemented using various approaches, distinguished by the duration of an Internet connection—a polling approach having a short duration and a websocket method having a long duration.

In the polling approach, the customer premises equipment performs frequent short-duration connections to the IoT service provider ("remote server(s)"). These connections serve multiple purposes. The connections (a) let the remote server(s) know that the customer premises equipment is still active, (b) give the customer premises equipment a way to publish status updates to the remote server(s), and (c) provide the remote server(s) a way to deliver configuration and commands to the customer premises equipment. Messages from mobile application to customer premises equipment are held in a database table, until the next customer premises equipment connection. The time between reconnects—"polling interval"—creates a tradeoff between latency and efficient use of network and database resources.

In the websocket approach, the customer premises equipment connects to the remote server(s), and the connection is maintained for as long as possible (e.g., for hour(s), day(s), etc.). This approach provides a path by which messages can be exchanged at any time from the mobile application to the customer premises equipment via the remote server(s), without (or with minimal) polling interval latency. Compared to the polling approach, commands no longer need to be stored in a database table and can be sent immediately upon receipt from the mobile application.

The websocket approach can be divided into two categories, a "broadcast" approach versus a "routed" approach. In the broadcast approach, every message received by the remote server(s) is broadcast to every remote server of the remote server(s). Each message may include a Customer ID. Each remote server then performs a local table lookup to determine if a device (e.g., mobile, customer premises equipment) with matching Customer ID is connected to the remote server(s). If so, the message is delivered to the device. If not, the message is discarded. However, this approach has issues when trying to scale this approach to more devices (customers), remote server(s), etc. For example, for a large customer base, most remote server(s) will spend excessive central processing unit (CPU) time discarding messages as all messages are broadcast to all remote server(s) such that each remote server has to spend limited computing resources to process the messages.

In the routed approach, the remote server(s) maintain a pair of global routing tables (i.e., first and second routing tables). The first routing table associates a Customer ID to the remote server and transmission control protocol (TCP)/internet protocol (IP) connection for the mobile application. The second table associates a Customer ID to the server and TCP/IP connection for the customer premises equipment. When messages are received on either connection, a table lookup must be performed—using the Customer ID—to deliver the message from the mobile application to the customer premises equipment, or vice-versa.

The routed approach helps address the broadcast discard problem. However, the routing approach introduces other problems when attempting to scale the approach to more customers.

First, global routing tables require a centralized database that is shared by all remote server(s). For a large numbers of customers, this sharing requires significant monetary resources in database computing power.

Second, mobile application connections are rarely long in duration. Customers open the mobile application on a wireless device, check on a few things in their home via the mobile application, and then close the mobile application. This means that the global routing table is in a constant state of rapid change as the global routing table is updated each time a customer performs this "quick" checking routine via the mobile application. This constant state of rapid change further increases the need for additional database computing power.

Third, while the customer premises equipment connections are designed to be long in duration, brief disruptions can force the customer premises equipment to reconnect. On occasion, network equipment between the customer premises equipment and the IoT Service Provider can cause large numbers of customer premises equipment to reconnect at the same time. This is referred to as a "connection storm." In a connection storm, the global routing table becomes a bottleneck due to the large number of updates caused by the customer premises equipment reconnecting, potentially delaying new customer premises equipment connections.

For certain applications—such as home security—connection delays may not only violate terms of service but may delay safety response(s) when the customer is in a hazardous situation.

Various embodiments of the present disclosure solve at least one problem with existing approaches by, for example, implementing server hashing to control and/or manage message and/or signaling flow between two entities in the premises monitoring system such as between a mobile application and customer premises equipment. In particular, for each customer, the system may be configured to connect the mobile application and customer premises equipment to the same server or server group such that a global routing table is no longer required. Further, lookups in a local routing table (e.g., in-memory table at as server) may be limited to the narrow context of a single server or sever group (e.g., a small cluster of related servers). The configuration(s) described herein may reduce the need for centralized data store computing power and/or provide the lowest latency possible for data traffic (e.g., message delivery).

Various embodiments of the configuration(s) described herein use the concept of server hashing. This is a technique in which data is separated into "shards" or "partitions" of the data store. For each data element, a hashing function may be applied to the lookup key to identify the partition in which the data is stored. The data lookup request may then be routed to the data store (e.g., data store server) responsible for that partition. Instead of a single server and a single storage area, the data store may be built on a collection of servers with separate storage.

The present disclosure applies the concept of consistent server hashing to data traffic management as described herein. During customer account creation, a customer may be assigned a hash value. The hash value may be associated with a single remote server, or a server group (e.g., a cluster of related remote servers). This hash value and its related server or server group may be shared by a limited number of customers. Once a hash is assigned to a customer, the assigned hash may be modified only for limited reasons.

When the customer mobile application and customer premises equipment connect for the first time, these two entities may receive the customer's hash value, and may be forced to reconnect using the hash value. The mobile (with the mobile application) and customer premises equipment may be configured to store the hash value in respective memory and use it on all subsequent connections. When the mobile and customer premises equipment connect to the remote server(s) and provide their hash value, they may be directed to their matching remote server or server group. Once connected to the remote server or server group, they may efficiently exchange data with each other, independent of any centralized resources.

Along with reducing dependence on a centralized data store and reducing message latency, the configuration described herein of using a consistent hash value for management data traffic may provide additional benefits. One additional potential benefit may be that the configuration can isolate groups of customers with special requirements to a specific server or server group that is configured to provide the special functions. For example, a group of customers may be assigned to a server or server group associated with a server hash where the customers may access features and functionality not available to other customers served by another server group or other server(s).

Another additional potential benefit of this approach may be fault isolation. Failures in one server or server group have no impact on customers in another server or server group. In some cases, devices for an error-prone customer (e.g., devices that are possibly infected with malware) may be reassigned to a solitary server or server group, where these devices for the specific customer may be more closely inspected without negatively affecting computing resources of other servers or server groups associated with other customers.

Another additional potential benefit of the configuration may be improved scalability compared to other configurations (e.g., polling approach, websocket approach). Different server or server groups may operate independently, with minimal dependence on shared computing and/or storage resources. This allows for a new server or server group to be added without impacting a pre-existing server or server group.

Before describing in detail exemplary embodiments, it is noted that some embodiments may reside in combinations of apparatus components and processing steps related to signaling and/or data flow management between entities in a premises system based on server hashing. Accordingly, components may be represented where appropriate by conventional symbols in the drawings, focusing on details that facilitate understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a," "an" and "the" are intended to include the plural forms as well, unless the context clearly indicates otherwise. The terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. Multiple components may interoperate and modifications and variations are possible to achieve electrical and data communication.

In some embodiments described herein, the term "coupled," "connected," and the like, may be used herein to indicate a connection, although not necessarily directly, and may include wired and/or wireless connections.

Referring now to the drawing figures in which like reference designators refer to like elements there is shown in FIG. 1 a system designated generally as "10." System 10 may include one or more premises systems 12a-12n associated with one or more premises devices 14a-14n such as wireless device 14a, customer premises equipment 14b (customer premises equipment 14b), etc. In one or more embodiments, the premises system 12 may be a premises monitoring system configured to monitor a premises using one or more devices 14 such as premises devices 14 (e.g., sensors, camera, video, home automation, etc.). Device 14 may be configured to communicate with each other as described herein.

System 10 includes one or more networks 16 that may be in communication with premises system 12 (e.g., premises monitoring system, premises security system, etc.), one or more initialization servers 18, one or more customer server data stores 23 and one or more load balancers 20. According to one or more embodiments, a data store (e.g., data store 23) as used herein may correspond to a database, network-connected storage, and/or other digital repository for storing data and/or information. Initialization server 18 may be configured to support connections from devices 14 that have not been provided a hash value by system 10, as described herein. Examples of such devices 14 may be a device 14 recently added to premises system 12, a device 14 that has been restored to factory settings, etc. In other words, in various embodiments, initialization server 18 may be a server that new customer devices 14 will initially connect to such that the initialization server 18 can inform the new customer device 14 of the customer's hash value. Initialization server 18 may request the customer's hash value from customer search data store 23, as described herein. Customer search data store 23 may be configured to store a data store table of hash values indexed by customer identifier(s) that are created and stored during account creation and hash value assignment. The hash value may be a plurality of alpha, numeric or alphanumeric characters. Once the new customer device 14 has been provided the hash value, the new customer device 14 may store the hash value and disconnects from the initialization server 18.

Load balancer 20 may be generally configured to distribute incoming requests among one or more server groups. In one or more embodiments, load balancer 20 may be configured to direct data traffic based on the hash value provided with the data traffic, as described herein. In one or more embodiments, load balancer 20 may store one or more tables (e.g., lookup tables) that maps respective hash values to respective server(s) or server groups.

System 10 further includes one or more remote server networks 22 in communication with one or more of load balancer 20, network 16, premises system 12, etc. Each remote server network 22 may be configured to include one or more server groups 24a-24n (collectively referred to as server group 24) and one or more server group data stores 26a-26n (collectively referred to as server group data store 28) where each server group 24 may be assigned and/or associated with a respective server group data store 28. As used herein in the figures, a dashed line or box may indicate an optional device or step.

Server group 24 includes two or more servers 26a-26n (collectively referred to as server 26). In one or more embodiments, servers 26a-26n may be remote servers in a remote computing environment. Depending on the computing environment, the mean time to replace a failed server 26 may be unacceptably high. Therefore, instead of assigning a customer to a single server 26, the customer may be assigned to a server group 24 (e.g., a cluster of related or grouped servers 26).

Within a server group 24, servers 26 may be configured to store and share information such as for example, the status of devices 14, connections for all customers in the server group 24, connection statuses, among other information. That is, certain highly volatile information (e.g., information that frequently changes) may be stored on server 26 memory (e.g., in-memory tables at server 26). The sharing of information may be performed via point-to-point connections between servers 26 and/or via a message bus shared among servers 26 in a server group, thereby facilitating low latency message delivery within server group 24. The shared state (i.e., sharing of information among servers 26) may be isolated within each server group 24, and server groups 24 operate independently of each other. In one or more embodiments, server 26 may store a shared in-memory connection table that stores information related to one or more of: customers serviced by the server group 24, servers 26 in server group 24, IP port of servers 26 in server group 24, etc.

In one example, a server 26 with 1 gigabyte (GB) of RAM may accommodate a shared state (e.g., shared information) for thousands of customers. The shared state may allow the network administrator to build the server 26 and/or server group 24 in a cost-effective manner. Further, one or more server groups 24 may be configured to perform one or more specific functions. For example, server group 24b may be configured to perform one or more functions different from at least one other server group 24. Alternatively, server groups 24 may be configured to provide similar or the same functions.

System 10 includes one or more server group stores 28a-28n (collectively referred to as server group data store 28). Server group data store 28 may store information related to one or more customers assigned to server group 24 according to the customer's assigned hash value. Information may include, for example, CP configuration settings, cluster configuration settings, among other information that may not change frequently, etc. In one or more embodiments, server group data store 28 may be partitioned on a per-server group 24 basis.

Figure 2:
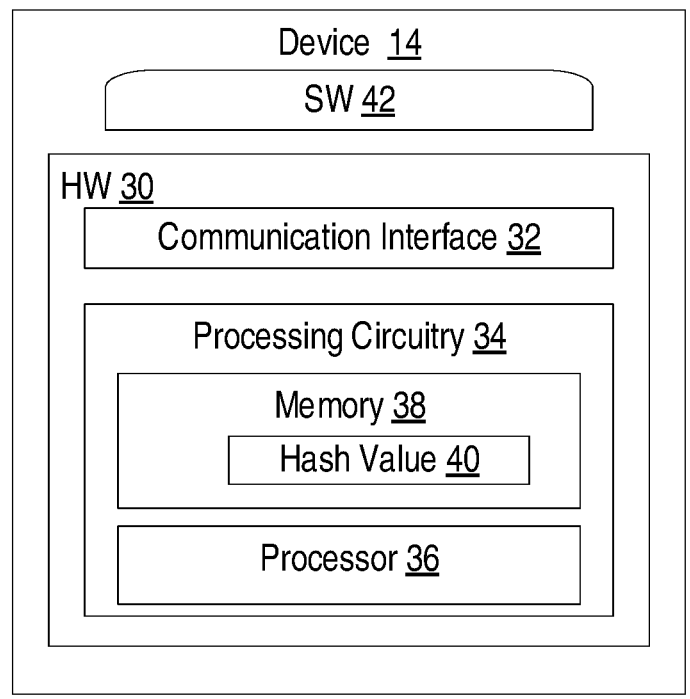
FIG. 2 is a block diagram of an example device according to some embodiments of the present disclosure.

With respect to FIG. 2, the example system 10 includes a device 14 that includes hardware 30 that facilitates the device 14 communicating with one or more entities in system 10 and to perform one or more functions described herein. In one or more embodiments, device 14 may be one of a customer premises equipment 14b, wireless 14a, etc.

The hardware 30 may include a communication interface 32 for setting up and maintaining at least a wired and/or wireless connection to one or more entities in system 10, such as with remote network 22, initialization server 18, load balancer, other devices 14, etc.

In the embodiment shown, the hardware 30 of device 14 further includes processing circuitry 34. The processing circuitry 34 may include a processor 36 and a memory 38. Memory 38 may be configured to store a hash value 40 as described herein. In particular, in addition to or instead of a processor, such as a central processing unit, and memory, the processing circuitry 34 may comprise integrated circuitry for processing and/or control, e.g., one or more processors, processor cores, field programmable gate arrays (FPGAs), and/or application specific integrated circuits (ASICs) adapted to execute instructions. The processor 36 may be configured to access (e.g., write to and/or read from) the memory 38, which may comprise any kind of volatile and/or nonvolatile memory, e.g., cache, buffer memory, random access memory (RAM), read-only memory (ROM), optical memory, and/or erasable programmable read-only memory (EPROM).

The device 14 further has software 42 stored internally in, for example, memory 38, or stored in external memory (e.g., data store, database, storage array, network storage device, etc.) accessible by the control device 15 via an external connection. Software 42 may include one or more software applications such as a mobile application if device 14 is a wireless device 14a. The software 42 may be executable by the processing circuitry 34. The processing circuitry 34 may be configured to control any of the methods and/or processes described herein and/or to cause such methods, and/or processes to be performed, e.g., by device 14. Processor 36 may correspond to one or more processors 36 for performing device 14 functions described herein. The memory 38 may be configured to store data, programmatic software code and/or other information described herein. In some embodiments, the software 42 may include instructions that, when executed by the processor 36 and/or other processing circuitry 34, cause the processor 36 and/or processing circuitry 34 to perform the processes described herein with respect to device 14.

Figure 3:
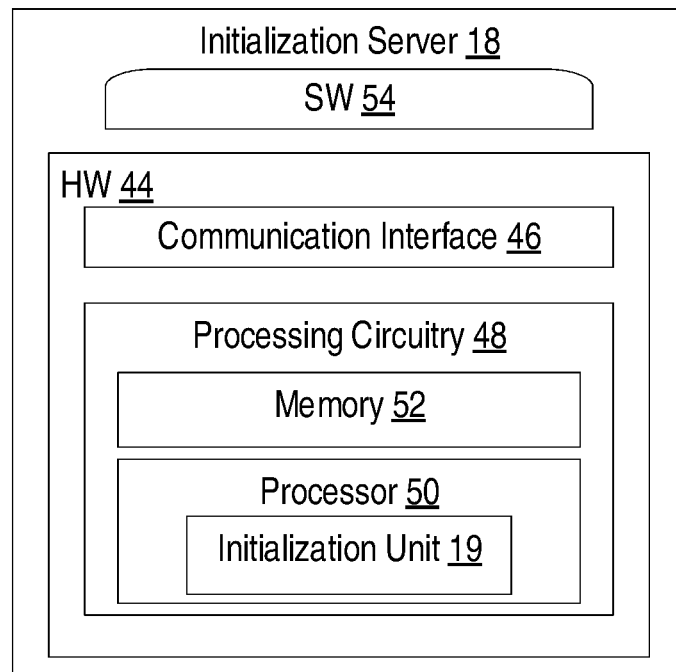
FIG. 3 is a block diagram of an example initialization server according to some embodiments of the present disclosure.

With respect to FIG. 3, the example system 10 may include an initialization server 18 that includes hardware 44 enabling the initialization server 18 to communicate with one or more entities in system 10 and to perform one or more functions described herein.

The hardware 44 may include a communication interface 46 for setting up and maintaining at least a wired and/or wireless connection to one or more entities in system 10, such as with device 14, customer search data store 23, network 16, etc.

In the embodiment shown, the hardware 44 of initialization server 18 further includes processing circuitry 48. The processing circuitry 48 may include a processor 50 and a memory 52. In particular, in addition to or instead of a processor 50, such as a central processing unit, and memory 52, the processing circuitry 48 may comprise integrated circuitry for processing and/or control, e.g., one or more processors, processor cores, FPGAs, and/or ASICs adapted to execute instructions. The processor 50 may be configured to access (e.g., write to and/or read from) the memory 52, which may comprise any kind of volatile and/or nonvolatile memory, e.g., cache, buffer memory, RAM, ROM, optical memory, and/or EPROM.

The initialization server 18 may have software 54 stored internally in, for example, memory 52, or stored in external memory (e.g., data store, database, storage array, network storage device, etc.) accessible by the initialization server 18 via an external connection. The software 54 may be executable by the processing circuitry 48. The processing circuitry 48 may be configured to control any of the methods and/or processes described herein and/or to cause such methods, and/or processes to be performed, e.g., by initialization server 18. Processor 50 corresponds to one or more processors 50 for performing initialization server 18 functions described herein. The memory 52 may be configured to store data, programmatic software code and/or other information described herein. In some embodiments, the software 54 may include instructions that, when executed by the processor 50 and/or other processing circuitry 48, cause the processor 50 and/or processing circuitry 48 to perform the processes described herein with respect to initialization server 18. For example, processing circuitry 48 of initialization server 18 may include initialization unit 19, which is configured to perform one or more functions described herein such as with respect to, for example, retrieving and communicating a hash value to device 14, as described herein.

In one or more embodiments, server 26 may include the same or substantially similar hardware and software as initialization server 18 but with initialization unit 19 being omitted from server 26. For example, server 26 may include hardware 44 and software 54, described above, such as to allow server 26 to perform one or more functions described herein.

Figure 4:
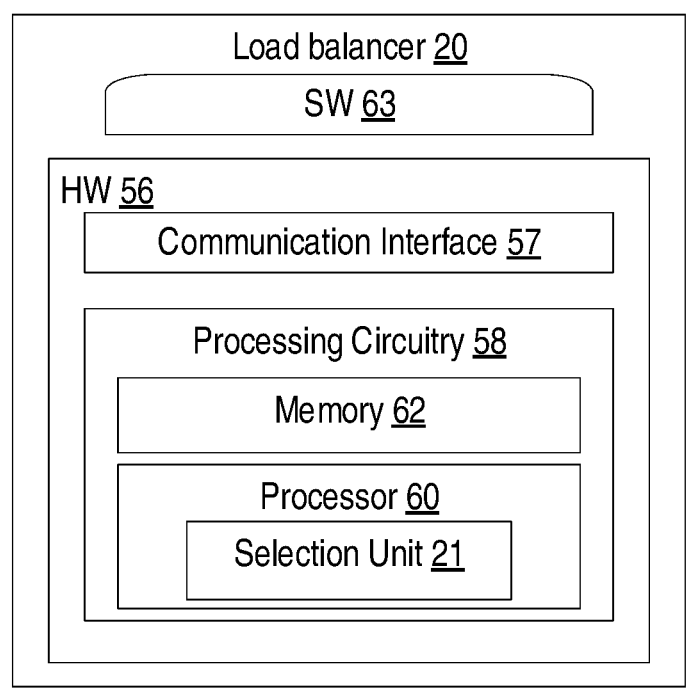
FIG. 4 is a block diagram of an example load balancer according to some embodiments of the present disclosure.

Referring to FIG. 4, the example system 10 includes a load balancer 20 that includes hardware 56 that facilitates communication between the load balancer 20 and one or more entities in system 10 and to perform one or more functions described herein.

The hardware 56 may include a communication interface 57 for setting up and maintaining at least a wired and/or wireless connection to one or more entities in system 10, such as with device 14, remote network 22, network 16, etc.

In the embodiment shown, the hardware 56 of load balancer 20 may further include processing circuitry 58. The processing circuitry 58 may include a processor 60 and a memory 62. In particular, in addition to or instead of a processor 60, such as a central processing unit, and memory 62, the processing circuitry 58 may comprise integrated circuitry for processing and/or control, e.g., one or more processors, processor cores, FPGAs, and/or ASICs adapted to execute instructions. The processor 60 may be configured to access (e.g., write to and/or read from) the memory 62, which may comprise any kind of volatile and/or nonvolatile memory, e.g., cache, buffer memory, RAM, ROM, optical memory, and/or EPROM.

The load balancer further has software 63 stored internally in, for example, memory 62, or stored in external memory (e.g., data store, database, storage array, network storage device, etc.) accessible by the load balancer 20 via an external connection. The software 63 may be executable by the processing circuitry 58. The processing circuitry 58 may be configured to control any of the methods and/or processes described herein and/or to cause such methods and/or processes to be performed, e.g., by load balancer 20. Processor 60 may correspond to one or more processors 60 for performing load balancer 20 functions described herein. The memory 62 is configured to store data, programmatic software code and/or other information described herein. In some embodiments, the software 63 may include instructions that, when executed by the processor 60 and/or other processing circuitry 58, cause the processor 60 and/or processing circuitry 58 to perform the processes described herein with respect to load balancer 20. For example, processing circuitry 58 of the load balancer may include selection unit 21, which is configured to perform one or more functions described herein such as with respect to, for example, selecting a server group 24 and server 26 within the server group 24 to service and/or process signaling from device 14 based on, for example as hash value associated with device 14, as described herein.

Figure 5:
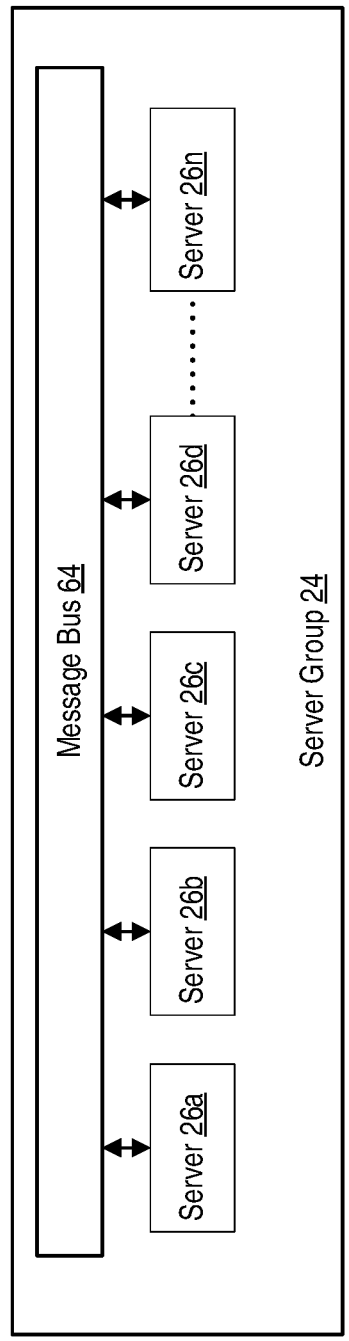
FIG. 5 is a block diagram of an example message bus according to some embodiments of the present disclosure.

FIG. 5 is a block diagram of an example message bus according to one or more embodiments of the present disclosure. Message bus 64 may be configured to be shared by the servers 26a-26n in server group 24, thereby allowing low latency communication among the servers 26 in the server group 24.

Figure 6:
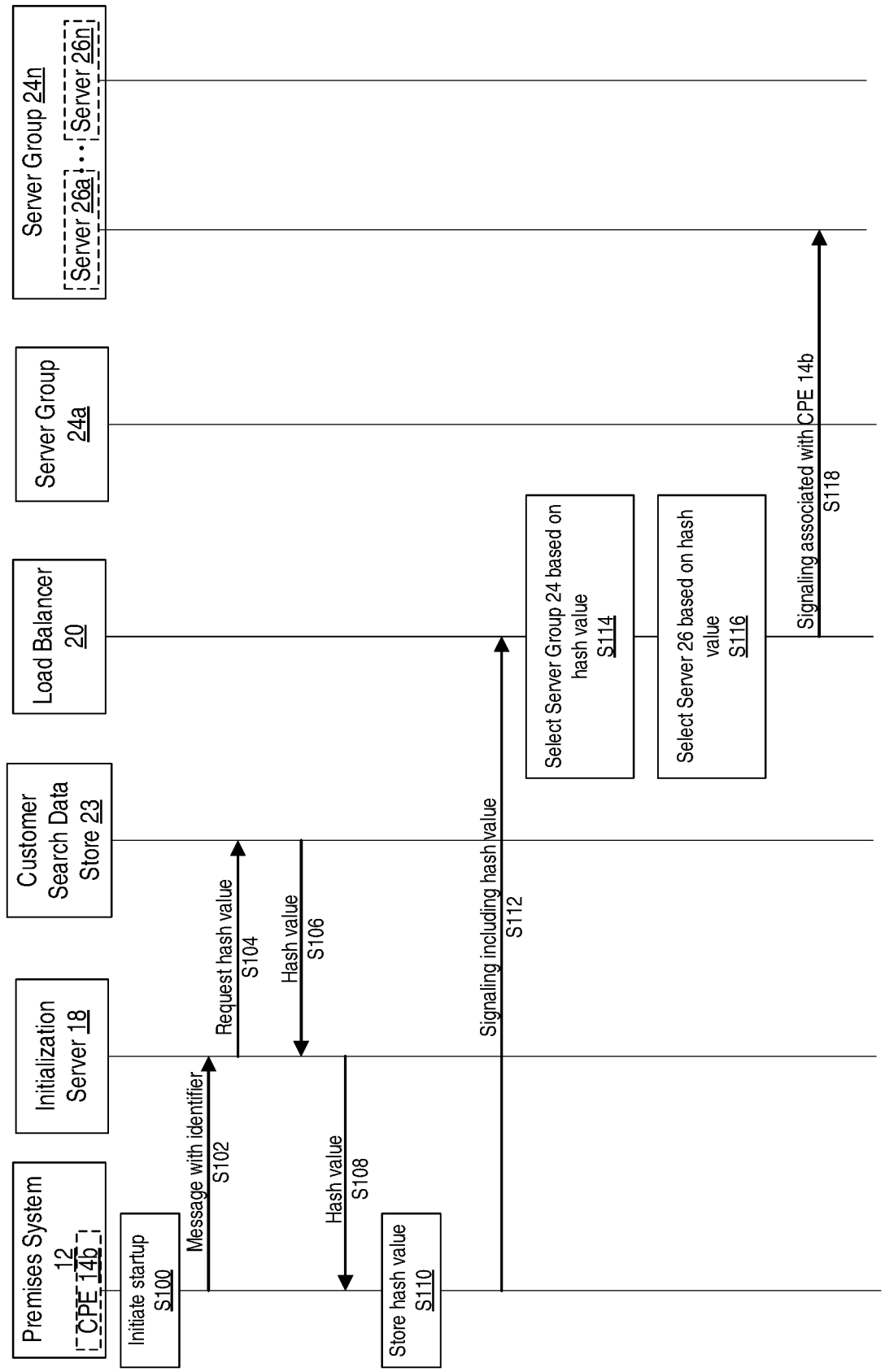
FIG. 6 is a signaling diagram of an example process according to some embodiments of the present disclosure.

FIG. 6 is a signaling diagram of an example signaling flow in accordance with one or embodiments of the present disclosure. One or more initialization server 18 function described below may be performed by one or more of processing circuitry 48, processor 50, initialization unit 19, etc. One or more device 14 functions described below may be performed by one or more of processing circuitry 34, processor 36, etc. One or more load balancer 20 function described below may be performed by one or more of processing circuitry 58, processor 60, selection unit 21, etc. One or more server 26 functions described below may be perform one or more of processing circuitry 58, processor 60, etc.

Customer premises equipment 14b initiates startup (Block S100). For example, customer premises equipment 14b may be a newly added device 14 to premises system 12 or a device 14 that has been reset, thereby clearing a previously stored hash value. Customer premises equipment 14b sends a message to initialization server 18 (Block S102). The message may indicate that customer premises equipment 14b is a new device 14. The message may include an identifier such as, for example, a customer ID and/or another identifier associated with the customer.

Initialization server 18 receives the message from customer premises equipment 14b and requests a hash value from a customer search data store 23 (Block S104). Customer search data store 23 determines a hash value associated with the customer ID in the message and transmits the hash value to the initialization server 18 (Block S106). For example, customer search data store 23 may store one or more tables mapping one or more customer IDs to one or more hash values. An example of such a table is provided below. In one or more embodiments, a hash value may be associated with one or more customer IDs.

TABLE

| Customer ID | Hash Value |
|---|---|
| 1 | A |
| 2 | B |
| 3 | C |

Initialization server 18 receives the hash value from the customer search data store 23 and transmits the hash value to the customer premises equipment 14b (Block S108). Customer premises equipment 14b receives the hash value from the initialization server 18 and stores the hash value that is specific to the customer associated with customer premises equipment 14b for later use (Block S110).

Customer premises equipment 14b is configured to transmit signaling to load balancer 20 where the signaling includes the hash value (Block S112). In one or more embodiments, signaling may correspond to one or more types of message such as requests, queries, updates, etc. For example, the signaling may be, for example, a connection request, service request, status update, other information associated with customer premises equipment 14b, etc. In one or more embodiments, the signaling may include the hash value in the URL that is used to connect to the server 26 or server group 24. In one or more embodiments, the hash value may be included in a header of packet or message. Load balancer 20 is configured to select a server group 24 from remote network 22 based on the hash value included in the signaling from customer premises equipment 14b (Block S114). While load balancer 20 may support various algorithms for distributing incoming requests among server groups 24, load balancer 20 is configured to direct data traffic based on the hash value embedded in the URL or header, for example.

Load balancer 20 is configured to select a server group 24 (e.g., server group 24n in this example) for serving the signaling based on the hash valued included in the signaling (Block S116). Load balancer 20 is configured to select a server 26 (e.g., server 26a in this example) from the selected server group 24 for servicing (i.e., processing, etc.) the signaling (Block S116). For example, the selection of the server 26 may be performed by random selection among the server group 24 or based on a server 26 from within the group meeting a predefined selection criterion. For example, the predefined selection criterion may include one or more of a workload threshold, computing resources thresholds, latency thresholds, etc. Load balancer 20 is configured to direct the signaling to the server 26 selected in Block S116 (Block S118).

Hence, system 10 may provide data flow management between entities (e.g., wireless device 14a, customer premises equipment 14b, etc.) in a premises monitoring system based on server hashing.

Figure 7A:
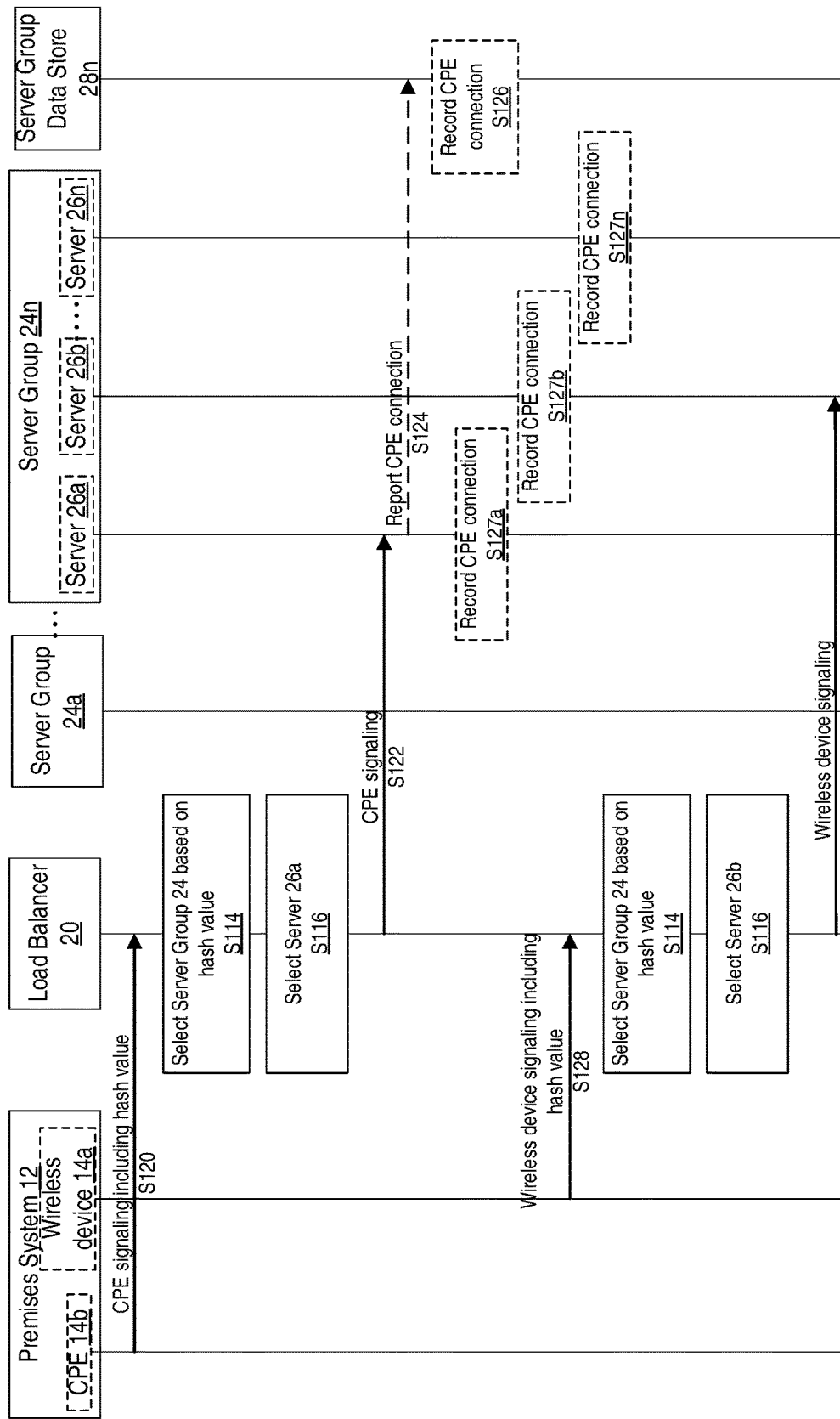
FIGS. 7a and 7b are a signaling diagram of another example process according to some embodiments of the present disclosure.
Figure 7B:
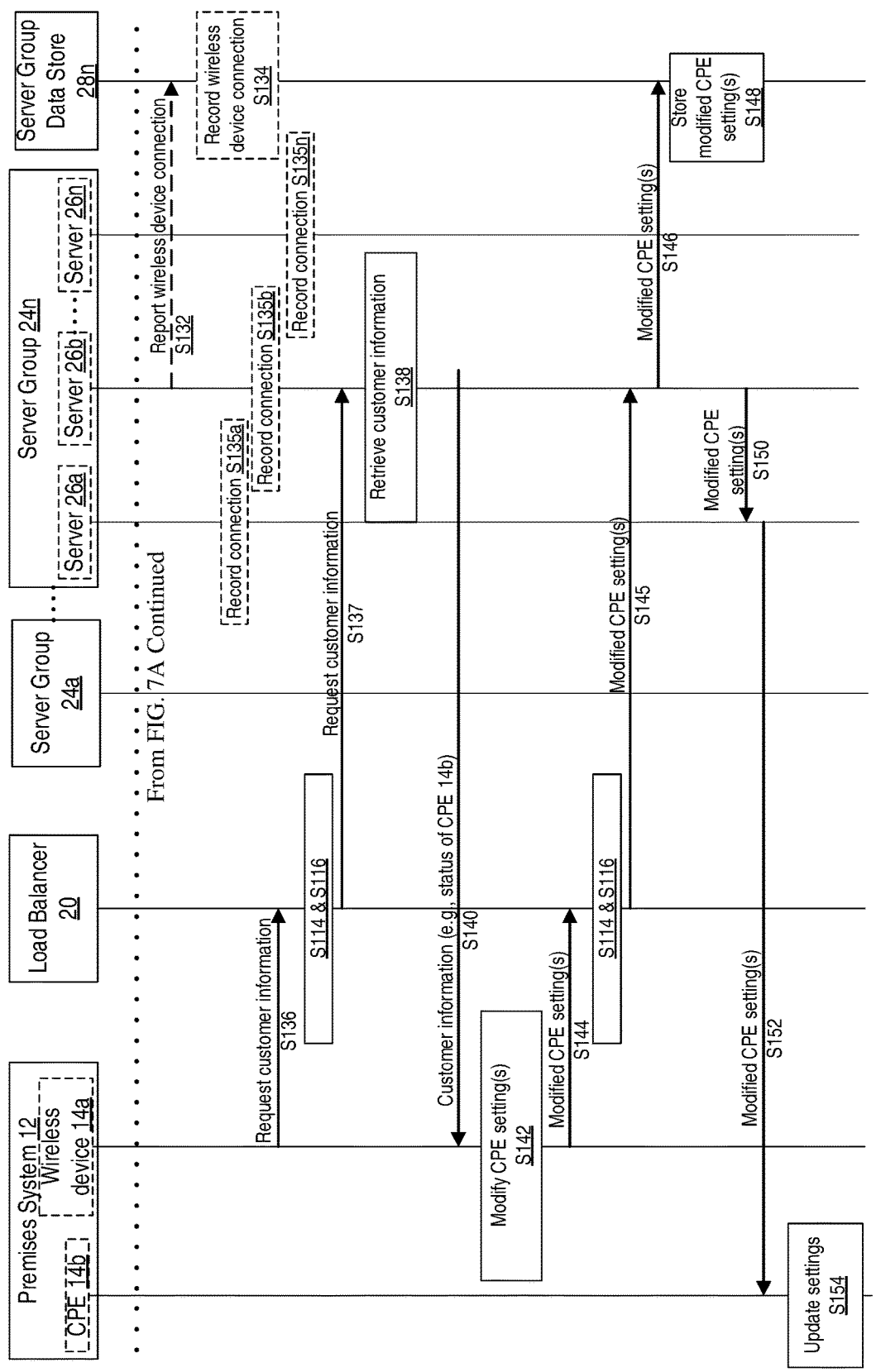

FIGS. 7A and 7B taken together are a signaling diagram of another example process according to one or more embodiments of the present disclosure. One or more initialization server 18 function described below may be performed by one or more of processing circuitry 48, processor 50, initialization unit 19, etc. One or more device 14 functions described below may be performed by one or more of processing circuitry 34, processor 36, etc. One or more load balancer 20 function described below may be performed by one or more of processing circuitry 58, processor 60, selection unit 21, etc. One or more server 26 functions described below may be perform one or more of processing circuitry 58, processor 60, etc.

Customer premises equipment 14b is configured to transmit signaling to load balancer 20 (Block S120). The signaling may include the hash value previously assigned to the customer associated with premises system 12. Load balancer 20 is configured to select a server group 24 (e.g., server group 24n in this example) for serving the signaling based on the hash valued included in the signaling (Block S114). Load balancer 20 is configured to select a server 26 (e.g., server 26a in this example) from the selected server group 24 for servicing and/or processing the signaling (Block S116). Load balancer 20 is configured to direct the signaling from the customer premises equipment 14b to the selected server 26 (e.g., server 26a in this example) from the server group 24 (Block S122).

Server 26 may receive the signaling from the load balancer 20 and report the customer premises equipment connection to the server group 24. Some examples of how the reporting may be performed as follows. In some embodiments of the reporting, server 26 reports the customer premises equipment connection to the server group data store 28 (e.g., server group data store 28a in this example) (Block S124). Server group data store 28 records the customer premises equipment connection for sharing this information with other servers 26 in the server group 24 (Block S126). For example, server group data store 28 may record the customer premises equipment connection in a shared connection table that is shared among the servers 26 in server group 24.

In some embodiments of the reporting, server 26 reports the customer premises equipment connection to all servers in the server group 24 using Message Bus 64, where each server 26 in server group 24 may receive the report and record the CPE connection, e.g., each server 26 updates a respective in-memory copy of the shared connection table (Block S127a-n). An example of the shared connection table is provided below.

| Shared Connection Table | | | |
|---|---|---|---|
| Customer ID | Device Type | Server | IP:Port |
| 1 | customer premises equipment | 1 | 10.0.0.1: 12345 |

-continued

Shared Connection Table

| Customer ID | Device Type | Server | IP:Port |
|---|---|---|---|
| 72 | customer premises equipment | 2 | 10.0.0.2:6789 |
| 1 | Wireless Device | 3 | 10.0.0.3:42012 |

Wireless device 14a is configured to transmit signaling to load balancer 20 (Block S128). The signaling from the wireless device 14a may include the hash value associated with the customer of premises system 12. Load balancer 20 is configured to select a server group 24 (e.g., server group 24a in this example) for serving and/or processing the signaling based on the hash valued included in the signaling (Block S114). Load balancer 20 is configured to select a server 26 (e.g., server 26b in this example) from the selected server group 24 for servicing and/or processing the signaling (Block S116).

Load balancer 20 is configured to direct the signaling from the wireless device 14a to the selected server 26 (e.g., server 26b in this example) (Block S130). Server 26 may receive the signaling from the load balancer 20 and report the wireless device 14 connection to the server group 24. Some examples of how the reporting may be performed are as follows. In some embodiments of the reporting, server 26 reports the wireless device 14 connection to the server group data store 28 (e.g., server group data store 28a in this example) (Block S132). Server group data store 28 records the wireless device 14 connection for sharing this information with other servers 26 in the server group 24 (Block S134). For example, server group data store 28 may record the wireless device 14 connection in a shared connection table that is shared among the servers 26 in server group 24.

In some embodiments of the reporting, server 26 reports the wireless device 14 connection to all servers 26 in the server group 24 using Message Bus 64, where each server 26 in server group 24 may receive the connection report and record the wireless device 14 connection, e.g., each server 26 updates a respective in-memory copy of the shared connection table (Block S135a-n).

Wireless device 14a transmits a request for customer information to load balancer 20 (Block S136). The request may include the hash value. Customer information may include one or more of the following: status of customer premises equipment 14b, etc. Load balancer 20 performs server group 24 and server 26 selection for servicing the request, as described above with respect to Block S114 and S116. Load balancer 20 transmits the request to the selected server 26 (e.g., server 26b) (Block S137).

Server 26 retrieves the requested customer information (Block S138). For example, server 26 may have the customer information stored in server 26 memory for low latency access in serving the request. In another example, server 26 may retrieve the customer information from server group data store 28. Server 26 is configured to transmit the requested customer information to wireless device 14a (Block S140).

Wireless device 14a receives modified customer premises equipment settings (Block S142). For example, a user of wireless device 14a may modify one or more customer premises equipment settings from the received customer information. In another example, wireless device 14a may modify at least one setting associated with the customer information. Wireless device 14a transmits the modified customer premises equipment setting(s) to load balancer 20 where the signaling including the modified customer premises equipment setting(s) also includes the hash value associated with the customer (Block S144). Load balancer 20 transmits the modified customer premises equipment setting(s) to the server 26 (e.g., server 26b in this example) selected based on the hash value included in the signaling, as described in Blocks S114 and S116 (Block S145).

Server 26 receives the modified customer premises equipment settings and transmits the modified customer premises equipment settings to server group data store 28 (e.g., server group data store 28a in this example) (Block S146). Server group data store 28 receives the modified customer premises equipment settings and stores the modified settings (Block S148). The modified customer premises equipment settings stored at server group data store 28 may be sharable among the servers 26 in the server group 24.

Server 26b transmits the modified customer premises equipment setting(s) to server 26 (e.g., server 26a in this example) such as, for example, via message bus 64 (Block S150). The modified customer premises equipment setting(s) may include only those customer premises equipment setting(s) that have been updated or may include all the customer premises equipment settings or at least the customer premises equipment setting(s) that have been updated. The server 26 transmits the customer premises equipment setting(s) update to customer premises equipment 14b (Block S152). Customer premises equipment 14b updates its setting according to the customer premises equipment setting(s) update (Block S154).

Another signaling example is described below. Customer premises equipment 14b may connect to server group 24a based on a hash value associated with customer premises equipment 14b, and customer premises equipment 14b may be randomly assigned to server 26a by load balancer 20. The customer premises equipment connection may be recorded in a connection table (e.g., in-memory table), which is stored in server 26a memory. The connection table entry may include the IP:Port of the customer premises equipment socket. This connection may then be shared with other servers 26 in the server group 24a, via, for example, a message bus 64. Other servers 26 may make a record of this connection in their own connection table stored in respective server 26 memories.

A mobile application in wireless device 14a connects to server group 24a, and may be randomly assigned to server 26n. The mobile application connection may be recorded in connection table stored at server 26n, and shared with other servers 26 in server group a via message bus 64. The mobile application may retrieve customer information, which includes the connection status of the customer premises equipment 14b. Server 26b has this information in memory and responds to the mobile application. The mobile application may modify a customer premises equipment configurable setting and transmits the modified customer premises equipment settings to Server 26b.

Server 26b may store the new setting in the server group data store 28a that is associated with server group 24a. In one or more embodiments, the customer premises equipment settings (i.e., customer premises equipment configuration) may be resent to customer premises equipment 14b in case, for example, the customer premises equipment memory is erased. Server 26b may send the update to Server 26a via message bus 64. Server 26a may deliver the update to customer premises equipment 14*b*, after finding the connection with IP:Port matching the entry in the connection table.

In another example, customer premises equipment 14*b* (e.g., control panel of a premises security system 12) may communicate information about the premises security system to a selected server 26 of server group 24, as described herein. The information may include one or more statuses of premises devices (e.g., sensors, smoke detectors, carbon monoxide detectors, etc.). The servers 26 in the server group 24 may share the information via, for example, a message bus 64 shared among the server group 24.

Figure 8A:
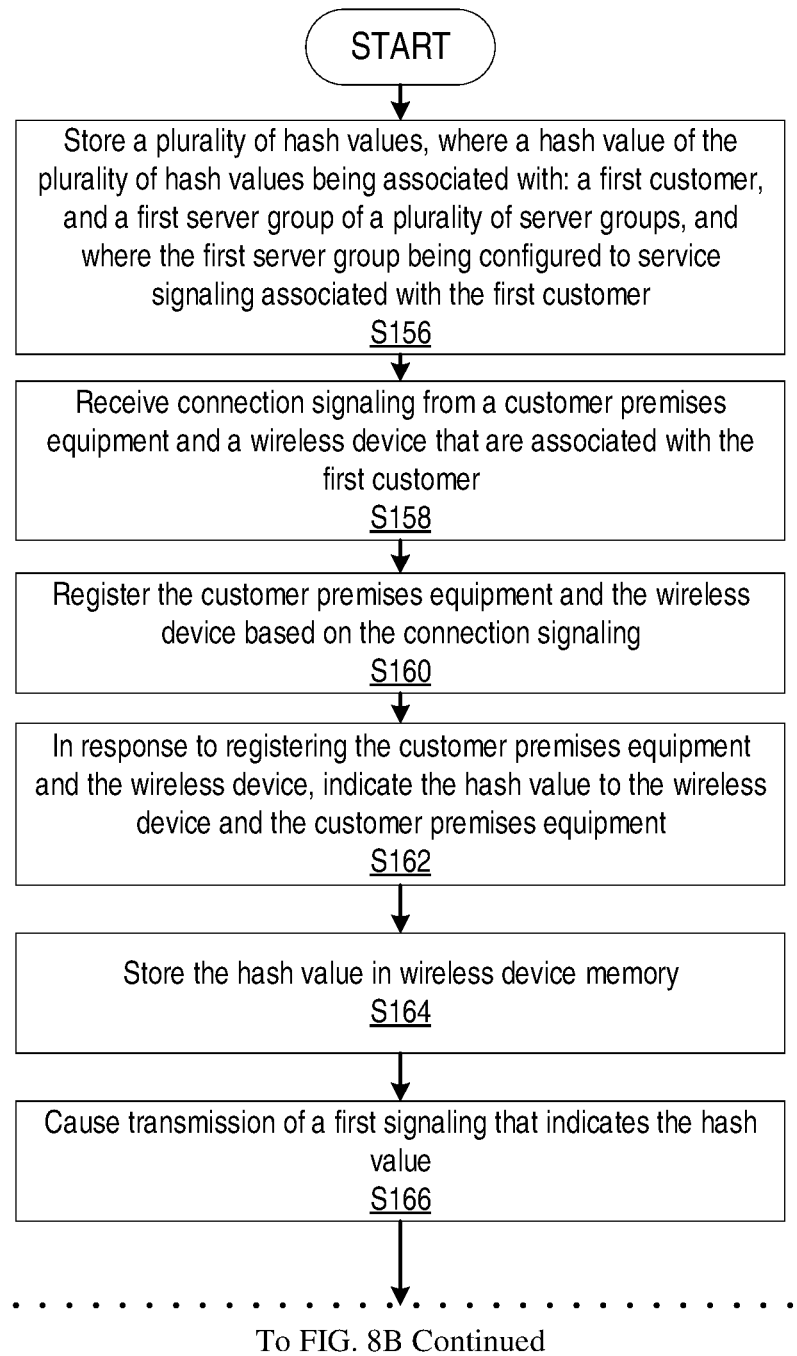
FIGS. 8a, 8b and 8c are a flowchart of an example process according to some embodiments of the present disclosure.
Figure 8B:
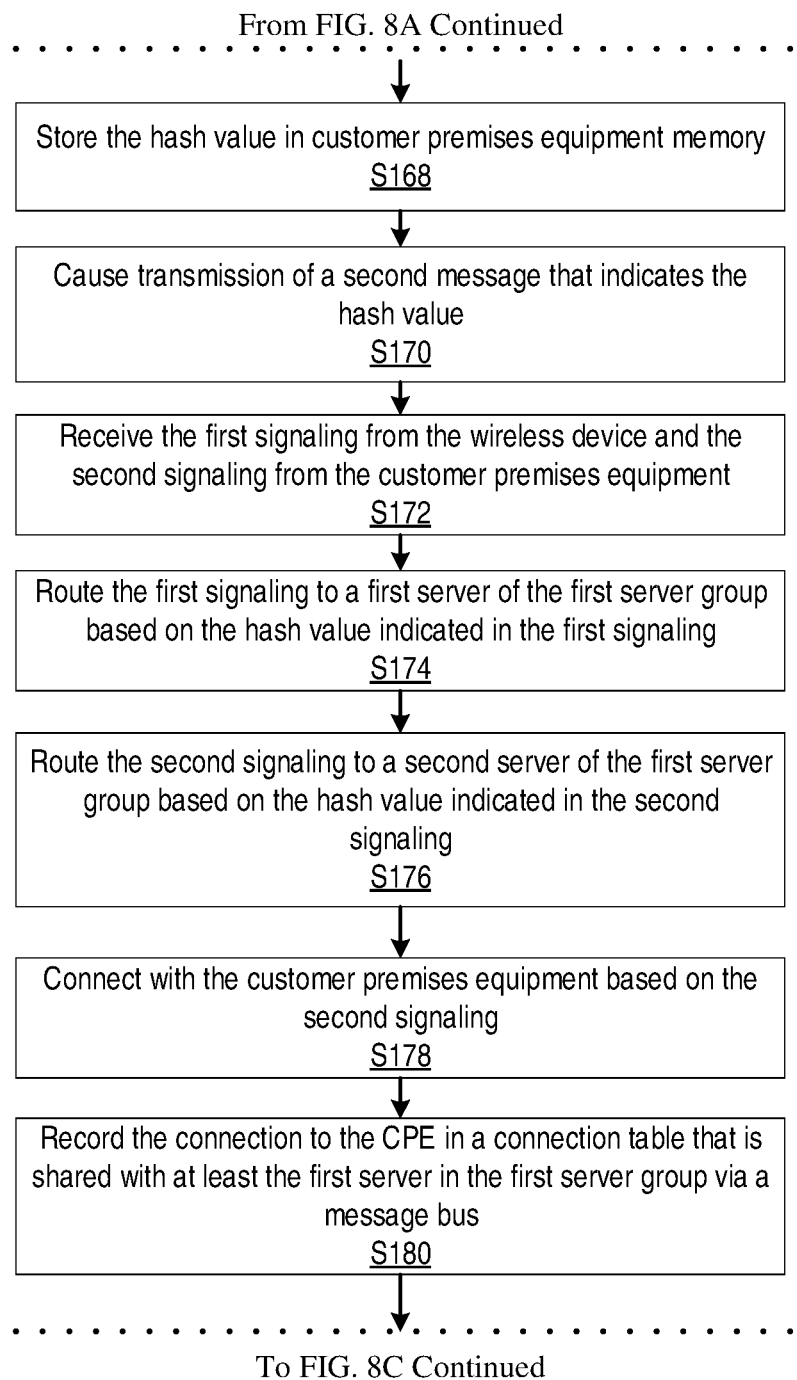
Figure 8C:
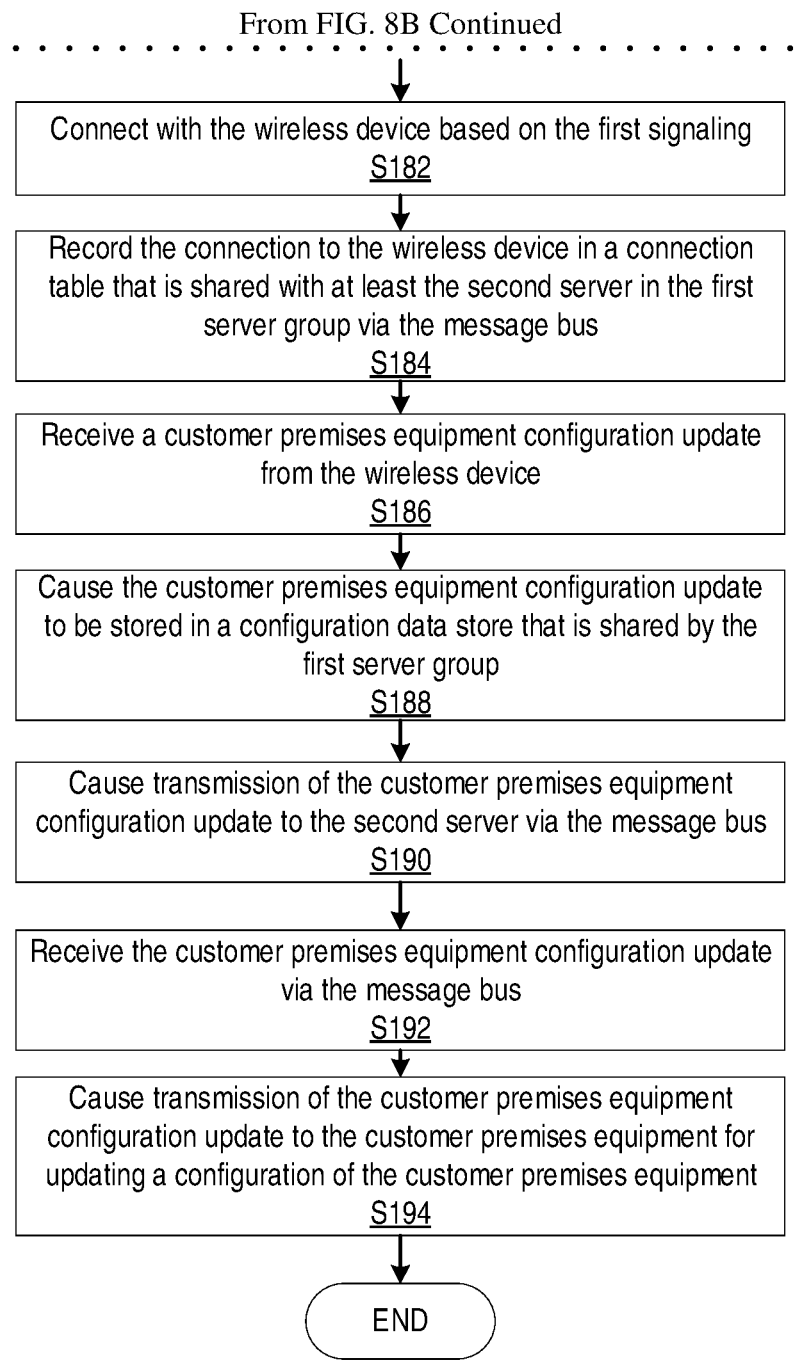

FIGS. 8A, 8B and 8C taken together are a flowchart of an example process according to one or more embodiments of the present disclosure. One or more initialization server 18 function described below may be performed by one or more of processing circuitry 48, processor 50, initialization unit 19, etc. One or more device 14 functions described below may be performed by one or more of processing circuitry 34, processor 36, etc. One or more load balancer 20 function described below may be performed by one or more of processing circuitry 58, processor 60, selection unit 21, etc. One or more server 26 functions described below may be perform one or more of processing circuitry 58, processor 60, etc.

A system 10 for managing customer premises equipment 14*b* is provided. The system 10 comprises a data store (e.g., customer search data store 23) configured to store a plurality of hash values where a hash value of the plurality of hash values is associated with a first customer and a first server group 24 of a plurality of server groups 24, where the first server group 24 is configured to service signaling associated with the first customer (Block S156). System 10 further includes an initialization server 18 that is configured to: receive connection signaling from a customer premises equipment 14*b* and a wireless device 14*a* that are associated with the first customer (Block S158), register the customer premises equipment 14*b* and the wireless device 14*a* based on the connection signaling (Block S160), and in response to registering the customer premises equipment 14*b* and the wireless device 14*a*, indicate the hash value to the wireless device 14*a* and the customer premises equipment 14*b* (Block S162).

The wireless device 14*a* is configured to store the hash value in wireless device memory 38 (Block S164), and cause transmission of a first signaling that indicates the hash value (Block S166). The customer premises equipment 14*b* is configured to store the hash value in customer premises equipment memory 38 (Block S168) and cause transmission of a second signaling that indicates the hash value (Block S170). System 10 further comprises a load balancer 20 configured to receive the first signaling from the wireless device 14*a* and the second signaling from the customer premises equipment 14*b* (Block S172), route the first signaling to a first server 26 of the first server group 24 based on the hash value indicated in the first signaling (Blocks S174), and route the second signaling to a second server 26 of the first server group 24 based on the hash value indicated in the second signaling (Block S176).

The second server 26 is configured to connect with the customer premises equipment 14*b* based on the second signaling (Block S178), and record the connection to the customer premises equipment 14*b* in a connection table that is shared with at least the first server 26 in the first server group 24 via a message bus (Block S180). The first server 26 is configured to connect with the wireless device 14*a* based on the first signaling (Block S182), record the connection to the wireless device 14*a* in a connection table that is shared with at least the second server 26 in the first server group 24 via the message bus 64 (Block S184), receive a customer premises equipment configuration update from the wireless device 14*a* (Block S186), cause the customer premises equipment configuration update to be stored in a configuration data store (e.g., server group data store 28) that is shared by the first server group 24 (Block S188), and cause transmission of the customer premises equipment 14*b* configuration update to the second server 26 via the message bus (Block S190). The second server 26 configured to receive the customer premises equipment configuration update via the message bus 64 (Block S192), and cause transmission of the customer premises equipment configuration update to the customer premises equipment 14*b* for updating a configuration of the customer premises equipment (Block S194).

According to one or more embodiments, the processing circuitry 58 of the load balancer 20 is further configured to: receive second signaling (e.g., messages, requests, etc.) from a wireless device 14*a* associated with the first customer, where the second signaling indicating the first hash value, determine the first server group 24 of the plurality of server groups 24 to service the second signaling associated with the first customer based on the first hash value 40, select a second server 26 of the plurality of servers 26 in the first server group 24 to service the second signaling, and route the second signaling to the second server 26 to service the second signaling.

According to one or more embodiments, the second server 26 comprises processing circuitry 58 configured to: receive the second signaling from the load balancer 20, connect with a wireless device 14 associated with the first customer based on the second signaling, record the connection to the wireless device 14 in a connection table shared by the plurality of servers 26, and service the second signaling.

According to one or more embodiments, the selection of the first server 26 to service the first signaling is performed based on random selection of a server 26 within the first server group 24.

According to one or more embodiments, the load balancer 20 is configured to store a mapping of the plurality of hash values to the plurality of server groups 24.

According to one or more embodiments, the first hash value 40 is associated with a plurality of customers including the first customer, and the processing circuitry 58 of the load balancer 20 is configured to route signaling (e.g., messages, requests), from any one of the plurality of customers, to the first server group 24 based on the mapping and the first hash value 40 indicated in the signaling.

According to one or more embodiments, the first hash value 40 corresponds to a plurality of alphanumeric characters.

According to one or more embodiments, the first signaling includes a first uniform resource locator (URL) where the first hash value 40 is embedded in the first URL.

According to one or more embodiments, the plurality of servers 26 in the first server group 24 are configured to communicate with each other using at least one of point-to-point connections or a shared message bus 64, where the plurality of servers 26 are associated with the first hash value 40.

According to one or more embodiments, the second server 26 comprises processing circuitry 48 configured to receive the second signaling from the load balancer 20, connect with a wireless device 14*a* associated with the first customer based on the second signaling, record the connection to the wireless device 14a in a connection table shared by the plurality of servers 26, and service the second signaling.

According to one or more embodiments, the plurality of servers 26 of the first server group 24 comprise a second server 26, where the first server 26 comprises processing circuitry 48 configured to receive a customer premises equipment configuration update from a wireless device 14a associated with the first customer, cause the customer premises equipment configuration update to be stored in a configuration data store (e.g., server group data store 28) that is shared by the plurality of servers 26 in the first server group 24, and send the customer premises equipment configuration update to the second server 26 using a point-to-point connection or shared message bus. The second server 26 comprises processing circuitry 48 configured to receive the customer premises equipment configuration update from the first server 26, and cause transmission of the customer premises equipment configuration update to the customer premises equipment for updating a configuration of the customer premises equipment.

According to one or more embodiments, the processing circuitry 48 of the first server 26 is further configured to: receive first signaling from the load balancer 20, the first signaling being from a customer premises equipment 14b associated with the first customer, connect with the customer premises equipment 14b based on the first signaling, and record the connection of the customer premises equipment 14b in a connection table that is shared with the plurality of servers 26.

According to one or more embodiments, the plurality of servers 26 in the first server group 24 are configured to share statuses and connection information for a plurality of devices 14 that connect to the first server group 24, where the plurality of devices 14 are associated with a plurality of customers that are associated with the first hash value 40.

According to one or more embodiments, each server group 24 in the plurality of server groups 24 is configured to operate independently from the other server groups 24 of the plurality of server groups 24.

In particular, some advantages of the signaling or message flows based on server hash assignment to a customer, described herein, may include the connection tables being small and being capable of being stored in server 26 memory. There may be no need to consult a centralized data store when entities in premises system 12 connect or disconnect, or when passing messages between entities in premises system 12. This may reduce latency, reduce the need for expensive computing power, and minimize the impact of connection storms.

Further, using a consistent server hash for signaling or message flows may advantageously allow for an efficient method for moving customers from a failed server group 24 to one or more other server groups 24.

The concepts described herein may be embodied as a method, data processing system, computer program product and/or computer storage media storing an executable computer program. Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Additionally, one or more blocks may be omitted according to various embodiments. Although some of the diagrams include arrows on communication paths to show a primary direction of communication, the communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present invention is not limited to what has been specifically shown and described herein above. In addition, unless mention was made above to the contrary, the accompanying drawings are not to scale. A variety of modifications and variations are possible in light of the above teachings without departing from the scope and spirit of the present disclosure.

What is claimed is:

1. A system comprising:
a data store storing a plurality of hash values, a hash value of the plurality of hash values being associated with:
a first customer; and
a first server group of a plurality of server groups, the first server group being configured to service signaling associated with the first customer;
an initialization server including processing circuitry configured to:
receive connection signaling from a customer premises equipment and a wireless device that are associated with the first customer;
register the customer premises equipment and the wireless device based on the connection signaling; and
in response to registering the customer premises equipment and the wireless device, indicate the hash value to the wireless device and the customer premises equipment; and
the wireless device including processing circuitry configured to:
store the hash value in wireless device memory;
cause transmission of a first signaling that indicates the hash value;
the customer premises equipment including processing circuitry configured to:
store the hash value in customer premises equipment memory;
cause transmission of a second signaling that indicates the hash value;
a load balancing server configured to:
receive the first signaling from the wireless device and the second signaling from the customer premises equipment;
route the first signaling to a first server of the first server group based on the hash value indicated in the first signaling; and
route the second signaling to a second server of the first server group based on the hash value indicated in the second signaling; and
the second server configured to:
connect with the customer premises equipment based on the second signaling;
record the connection to the customer premises equipment in a connection table that is shared with at least the first server in the first server group via a message bus;
the first server configured to:
connect with the wireless device based on the first signaling;
record the connection to the wireless device in a connection table that is shared with at least the second server in the first server group via the message bus;
receive a customer premises equipment configuration update from the wireless device;
cause the customer premises equipment configuration update to be stored in a configuration data store that is shared by the first server group; and
cause transmission of the customer premises equipment configuration update to the second server via the message bus; and
the second server configured to:
receive the customer premises equipment configuration update via the message bus; and
cause transmission of the customer premises equipment configuration update to the customer premises equipment for updating a configuration of the customer premises equipment.

2. A system comprising:
a plurality of server groups, each server group of the plurality of server groups being associated with a respective one of a plurality of hash values, the plurality of hash values comprising a first hash value that is assigned to a wireless device and a customer premises equipment that are associated with a first customer; and
a load balancer in communication with the plurality of server groups comprising a first server group, the load balancer comprising:
processing circuitry configured to:
receive first signaling from the customer premises equipment associated with the first customer, the first signaling indicating the first hash value;
receive second signaling from the wireless device associated with the first customer, the second signaling indicating the first hash value;
route the first signaling to a first server of the first server group to service the first signaling based on the first hash value indicated in the first signaling; and
route the second signaling to a second server of the first server group to service the second signaling based on the first hash value indicated in the second signaling;
the first server comprising processing circuitry configured to:
connect with the customer premises equipment based on the first signaling; and
record the connection to the customer premises equipment in a connection table that is shared with at least the second server of the first server group via a message bus; and
the second server comprising processing circuitry configured to:
connect with the wireless device based on the second signaling; and
record the connection to the wireless device in a connection table that is shared with at least the first server of the first server group via the message bus.

3. The system of claim 2, wherein the processing circuitry of the load balancer is further configured to:
determine the first server group of the plurality of server groups to service the customer premises equipment based on the first hash value;
select the first server of the plurality of servers in the first server group to service the first signaling;

determine the first server group of the plurality of server groups to service the second signaling associated with the first customer based on the first hash value; and select the second server of the plurality of servers in the first server group to service the second signaling.

4. The system of claim 3, wherein the second server comprises processing circuitry configured to:

receive the second signaling from the load balancer; and service the second signaling.

5. The system of claim 2, wherein the processing circuitry of the load balancer is further configured to select the first server group of the plurality of server groups to service the customer premises equipment based on random selection of a server within the first server group.

6. The system of claim 2, wherein the load balancer is configured to store a mapping of the plurality of hash values to the plurality of server groups.

7. The system of claim 6, wherein the first hash value is associated with a plurality of customers including the first customer; and the processing circuitry of the load balancer being configured to route signaling, from any one of the plurality of customers, to the first server group based on the mapping and the first hash value indicated in the signaling.

8. The system of claim 2, wherein the first hash value corresponds to a plurality of alphanumeric characters.

9. The system of claim 2, wherein the first signaling includes a first uniform resource locator (URL), the first hash value being embedded in the first URL.

10. The system of claim 2, wherein a plurality of servers in the first server group are configured to communicate with each other using at least one of point-to-point connections or a shared message bus, the plurality of servers being associated with the first hash value.

11. The system of claim 2, wherein the processing circuitry of the first server is further configured to:

receive a customer premises equipment configuration update from a wireless device associated with the first customer;

cause the customer premises equipment configuration update to be stored in a configuration data store that is shared by the plurality of servers in the first server group; and send the customer premises equipment configuration update to the second server using a point-to-point connection or shared message bus; and the processing circuitry of the second server is further configured to:

receive the customer premises equipment configuration update from the first server; and cause transmission of the customer premises equipment configuration update to the customer premises equipment for updating a configuration of the customer premises equipment.

12. The system of claim 11, wherein the processing circuitry of the first server is further configured to:

receive first signaling from the load balancer, the first signaling being from the customer premises equipment associated with the first customer.

13. The system of claim 2, wherein a plurality of servers in the first server group are configured to share statuses and connection information for a plurality of devices that connect to the first server group, the plurality of devices being associated with a plurality of customers that are associated with the first hash value.

14. The system of claim 2, wherein each server group in the plurality of server groups is configured to operate independently from the other server groups of the plurality of server groups.

15. A method implemented by a system, the system comprising a plurality of server groups and a load balancer in communication with the plurality of server groups, each server group of the plurality of server groups being associated with a respective one of a plurality of hash values, the plurality of server groups comprising a first server group, the plurality of hash values comprising a first hash value that is assigned to a wireless device and a customer premises equipment that are associated with a first customer, the method comprising:

receiving first signaling from the customer premises equipment associated with the first customer, the first signaling indicating the first hash value;

receiving second signaling from the wireless device associated with the first customer, the second signaling indicating the first hash value;

routing the first signaling to a first server to service the first signaling of the first server group to service the first signaling based on the first hash value indicated in the first signaling;

routing the second signaling to a second server of the first server group to service the second signaling based on the first hash value indicated in the second signaling;

connecting, by the first server, with the customer premises equipment based on the first signaling;

recording, by the first server, the connection to the customer premises equipment in a connection table that is shared with at least the second server of the first server group via a message bus;

connecting, by the second server, with the wireless device based on the second signaling; and recording, by the second server, the connection to the wireless device in a connection table that is shared with at least the first server of the first server group via the message bus.

16. The method of claim 15, further comprising:

determining the first server group of the plurality of server groups to service the customer premises equipment based on the first hash value;

selecting the first server of the plurality of servers in the first server group to service the first signaling;

determining the first server group of the plurality of server groups to service the second signaling associated with the first customer based on the first hash value; and selecting the second server of the plurality of servers in the first server group to service the second signaling.

17. The method of claim 16, wherein the first hash value is associated with a plurality of customers including the first customer; and the method claim further comprising routing signaling, from any one of a plurality of devices associated with any one of the plurality of customers, to the first server group based on the first hash value indicated in the signaling.

18. The method of claim 15, wherein the first signaling includes a first uniform resource locator (URL), the first hash value being embedded in the first URL.

19. The method of claim 15, wherein a plurality of servers in the first server group are configured to communicate with each other using at least one of point-to-point connections or a shared message bus, the plurality of servers being associated with the first hash value.

20. The method of claim 15, wherein a plurality of servers in the first server group are configured to share statuses and connection information for a plurality of devices that connect to the first server group, the plurality of devices being associated with a plurality of customers that are associated with the first hash value; and each server group in the plurality of server groups is configured to operate independently from the other server groups of the plurality of server groups.

* * * * *